(12) United States Patent
Ke et al.

(10) Patent No.: US 11,695,318 B2
(45) Date of Patent: Jul. 4, 2023

(54) CURRENT FEEDBACK CONTROL FOR A POWER CONVERTER WITH MULTIPLE FEEDBACK LOOPS

(71) Applicant: Hitachi Energy Switzerland AG, Baden (CH)

(72) Inventors: Xinhua Ke, Windisch (CH); Beat Buchmann, Baden (CH)

(73) Assignee: Hitachi Energy Switzerland AG, Baden (CH)

( * ) Notice: Subject to any disclaimer, the term of this patent is extended or adjusted under 35 U.S.C. 154(b) by 322 days.

(21) Appl. No.: 17/273,038

(22) PCT Filed: Sep. 3, 2018

(86) PCT No.: PCT/EP2018/073587
§ 371 (c)(1),
(2) Date: Mar. 3, 2021

(87) PCT Pub. No.: WO2020/048579
PCT Pub. Date: Mar. 12, 2020

(65) Prior Publication Data
US 2021/0328495 A1    Oct. 21, 2021

(51) Int. Cl.
*H02M 1/00* (2006.01)
*H02M 7/5387* (2007.01)

(52) U.S. Cl.
CPC ..... *H02M 1/0012* (2021.05); *H02M 7/53875* (2013.01)

(58) Field of Classification Search
CPC .................................................. H02M 1/0012
See application file for complete search history.

(56) References Cited

U.S. PATENT DOCUMENTS 10,404,064 B2 *  9/2019  Lyu .......................... H02M 1/15
2007/0133233 A1  6/2007  Cameron et al.
(Continued)

FOREIGN PATENT DOCUMENTS

CN      106374452 A      2/2017
DE   102012218889 A1     4/2014
(Continued)

OTHER PUBLICATIONS

Bai, Haofeng, et al., "Passivity Enhancement in RES Based Power Plant with Paralleled Grid-Connected Inverters", 2016 IEEE Energy Conversion Congress and Exposition (ECCE), Milwaukee, WI, USA, Sep. 18-22, 2016, 8 pages.

Freijedo, Francisco D., "Design for Passivity in the Z-Domain for LCL Grid-Connected Converters", IECON 2016—42nd Annual Conference of the IEEE Industrial Electronics Society, Florence, Italy, Oct. 23-26, 2016, pp. 7016-7021.

(Continued)

*Primary Examiner* — Peter M Novak
(74) *Attorney, Agent, or Firm* — Slater Matsil, LLP (57) ABSTRACT

A method performed by a control system of a power electronics converter. A first part of a grid-side current controller runs a first feedback control algorithm having a first control cycle time and includes at least proportional control using a proportional gain. A third part of the controller runs a third feedback control algorithm having the first control cycle time and acting on an output from the first control algorithm after SOA limits have been applied and includes counteracting the proportional control of the first feedback control algorithm. A second part of the controller runs a second feedback control algorithm having a second control cycle time, less than the first control cycle time, and acting on an output from the third control algorithm with the (Continued)

same polarity as the first control algorithm and includes proportional control using the proportional gain.

22 Claims, 5 Drawing Sheets

(56) References Cited

U.S. PATENT DOCUMENTS

| | | |
|---|---|---|
| 2007/0176815 A1 | 8/2007 | Kost |
| 2008/0232143 A1 | 9/2008 | Chu et al. |
| 2011/0127933 A1 | 6/2011 | Shimada et al. |
| 2014/0375131 A1 | 12/2014 | Spanoche et al. |
| 2015/0162847 A1 | 6/2015 | Ushiki et al. |
| 2015/0229234 A1 | 8/2015 | Park et al. |
| 2016/0144723 A1* | 5/2016 | Guggisberg .............. B60L 9/24 191/7 |
| 2016/0172853 A1 | 6/2016 | Eckert et al. |

FOREIGN PATENT DOCUMENTS

| | | |
|---|---|---|
| EP | 3694098 A1 | 8/2020 |
| JP | H06225574 A | 8/1994 |
| JP | 2009201248 A | 9/2009 |
| JP | 2011120322 A | 6/2011 |
| JP | 2014048807 A | 3/2014 |
| JP | 2014533921 A | 12/2014 |
| JP | 2015012636 A | 1/2015 |
| JP | 6336236 B1 | 6/2018 |
| WO | 2017159117 A1 | 9/2017 |

OTHER PUBLICATIONS

Harnefors, Lennart, et al., "Passivity-Based Stability Assessment of Grid-Connected VSCs—An Overview", IEEE Journal of Emerging and Selected Topics in Power Electronics, Mar. 2016, 11 pages.

Harnefors, Lennart, et al., "Passivity-Based Controller Design of Grid-Connected VSCs for Prevention of Electrical Resonance Instability", IEEE Transactions on Industrial Electronics, vol. 62, No. 2, Feb. 2015, pp. 702-710.

Harnefors, Lennart, et al., "VSC Input-Admittance Modeling and Analysis Above the Nyquist Frequency for Passivity-Based Stability Assessment", IEEE Transactions on Industrial Electronics, vol. 64, No. 8, Aug. 2017, pp. 6362-6370.

He, Wei, et al., "Incremental Passivity Based Control for DC-DC Boost Converter With Circuit Parameter Perturbations Using Nonlinear Disturbance Observer", Conference Paper, Industrial Electronics Society, 42nd Annual Conference, Oct. 2016, 7 pages.

Zhong, Qing-Chang, et al., "Port-Hamiltonian Control of Power Electronic Converters to Achieve Passivity", 2017 IEEE 56th Annual Conference on Decision and Control (CDC), Melbourne, Australia, Dec. 12-15, 2017, 6 pages.

* cited by examiner

CURRENT FEEDBACK CONTROL FOR A POWER CONVERTER WITH MULTIPLE FEEDBACK LOOPS

CROSS-REFERENCE TO RELATED APPLICATIONS

This application is a national stage application of International Application No. PCT/EP2018/073587, filed on Sep. 3, 2018, which application is hereby incorporated herein by reference.

TECHNICAL FIELD

The present disclosure relates to a current controller for controlling power output from a power electronics converter to a power grid.

BACKGROUND

Power electronics converters exist in many different types and topologies for different applications. Typically, they are connected to one or more Direct Current (DC) or Alternating Current (AC) grid(s) and include a plurality of valves comprising semiconductor switches. Examples of converter types to include Neutral Point Clamped (NPC) three level converters and Modular Multilevel Converters (MMC), in various topologies for respective applications, such as rail interties, Static Compensators (STATCOM) and Pumped Hydro or wind power converters.

Grid connected power electronics converters with active behaviour are not welcomed by the grid operators, since in this case, if oscillations/resonances occur in the grid in the frequency range where the converter is active, the converter will behave as a source to deliver energy to support the oscillations/resonances, instead of damping the oscillations by consuming energy. Therefore, it is desirable that the power electronics converters are passive in the relevant frequency range.

Active behaviour has been observed in power electronics converters with various topologies in various applications. This happens typically in the frequency range between 300 to 1000 Hz, especially due to the power electronics converters control, which has a time discrete current controller. The active behaviour is related to the delay introduced by the time discrete control. Active behaviour has been observed for instance in NPC three level converters and MMCs, in various applications, such as rail interties, STATCOMs and Pumped Hydro or wind power converters. In one example, in a rail intertie application, activity behaviour of the power electronics converter was observed on a 50 Hz public grid side in the frequency range between 350 to 850 Hz.

SUMMARY

It is an objective of the present invention to provide reduced active behaviour on the grid side of a power electronics converter, i.e. in cases of oscillations/resonances the converter should have reduced, or no, injection of active power into the grid to avoid stimulation of resonances, at least within a relevant frequency range.

According to an aspect of the present invention, there is provided a method to performed by a control system of a power electronics converter. The converter comprises a valve arrangement and is connected to a power grid. The method comprises providing a grid-side current controller for controlling power output from the converter to the grid. The method also comprises, as (or in) a first part of the controller, running a first feedback control algorithm with an input based on a difference between a predetermined current reference and a first feedback current measurement of a current in the converter. The first feedback control algorithm has a first control cycle time and includes at least proportional control using a proportional gain. The method also comprises, as (or in) a third part of the controller, running a third feedback control algorithm with an input based on the first feedback current measurement. The third feedback control algorithm has the first control cycle time and acts on an output from the first control algorithm after SOA limits have been applied to said first control algorithm output and includes counteracting the proportional control of the first feedback control algorithm using the proportional gain. The method also comprises, as (or in) a second part of the controller, running a second feedback control algorithm with an input based on a second feedback current measurement of the current. The second feedback control algorithm has a second control cycle time and acts on an output from the third control algorithm with the same polarity as the first control algorithm and includes proportional control using the proportional gain. The second control cycle time is less than the first control cycle time.

According to another aspect of the present invention, there is provided a computer program product comprising computer-executable components for causing a control system to perform an embodiment of the method of the present disclosure when the computer-executable components are run on processing circuitry comprised in the control system.

According to another aspect of the present invention, there is provided a control system for a power electronics converter comprising a valve to arrangement and connected to a power grid. The control system comprises processing circuitry, and data storage storing instructions executable by said processing circuitry whereby said control system is operative to provide a grid-side current controller for controlling power output from the converter to the grid. The control system is also operative to, as a first part of the controller, run a first feedback control algorithm with an input based on a difference between a predetermined current reference and a first feedback current measurement of a current in the converter, wherein the first feedback control algorithm has a first control cycle time and includes at least proportional control using a proportional gain. The control system is also operative to, as a third part of the controller, run a third feedback control algorithm with an input based on the first feedback current measurement, wherein the third feedback control algorithm has the first control cycle time and acts on an output from the first control algorithm after SOA limits have been applied to said first control algorithm output and includes counteracting the proportional control of the first feedback control algorithm using the proportional gain. The control system is also operative to, as a second part of the controller, run a second feedback control algorithm with an input based on a second feedback current measurement of the current, wherein the second feedback control algorithm has a second control cycle time and acts on an output from the third control algorithm with the same polarity as the first control algorithm and includes proportional control using the proportional gain. The second control cycle time is less than the first control cycle time.

By applying proportional feedback of the grid-side current controller in the faster tasks, i.e. with a shorter (herein called second) control cycle time, the passivity of the converter can be improved. Other parts of the current controller, e.g. integral or resonance control, can remain in slower tasks with a longer (herein called first) control cycle time. Also, since the SOA limits should be applied in slower tasks after the whole current control, i.e. including the proportional control thereof, has been applied, the proportional control also remains in the slower tasks. In order not to do the faster tasks proportional feedback on top of the proportional feedback of the slower tasks, the proportional control is counteracted in slower tasks after the application of SOA limits.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The control cycle time as herein used is the time period for a each control to cycle, i.e. the time interval between two control cycles. In faster tasks of the control system, a shorter control cycle time is used than in the slower tasks of the control system. With a shorter control cycle time, the control system is faster to react, but with a longer control cycle, the control system is less heavy on processing resources.

The proportional control of the second part, herein called B, of the controller should have the same polarity as the proportional control of the first part, herein called A, while the proportional control of the third part, herein called C, should have the different polarity compared with the proportional control of the first part, i.e. if the proportional control of the first part subtracts from the reference current, then the third part adds to the reference current to counteract the proportional control of the first part and the second part subtracts from the reference current again, and vice versa.

Figure 1:
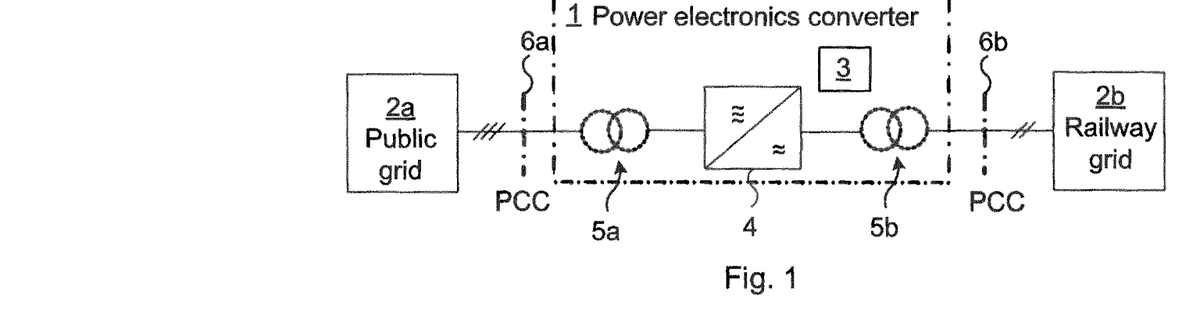
FIG. 1 is a schematic circuit diagram of an embodiment of a power electronics converter connected to at least one power grid.

FIG. 1 illustrates a power electronics converter 1 connected to at least one power grid 2. In the embodiment of FIG. 1, the converter 1 is connected between a first grid 2a and a second grid 2b. The present invention is not limited to the topology of the converter 1, nor to the type of grid(s) 2 it is connected to. For instance, the power electronics converter 1 may be a Neutral Point Clamped (NPC) three level converter or a Modular Multilevel Converter (MMC).

The converter 1 has a control system 3 which includes current control for controlling power output (positive or negative) from the converter 1 to the grid 2. If the converter 1 is connected to more than one grid 2, separate current control is typically provided for each of the grids by the control system 3.

The grid 2, or either of the grids 2a and 2b, which the converter 1 is connected to may typically be an Alternating Current (AC) grid, e.g. with a nominal frequency of 50 or 60 Hz, with any number of phases, such as a one or three-phase AC grid, e.g. a three-phase grid. For instance, the power electronics converter may be configured to operate as a three-to-one phase rail intertie (as in FIG. 1), as a Static Compensator (STATCOM) or as a three-to-three phase converter such as a pumped hydro, back-to-back, or wind power converter.

The converter 1 typically comprises a transformer 5 between its valve arrangement 4 and the grid 2, or each of the grids 2a and 2b. In some embodiments, a reactor can be used instead of a transformer. The converter and the grid connect together at a Point of Common Connection/Coupling (PCC) 6.

In the example embodiment of FIG. 1, the converter 1 is connected between a public (e.g. distribution or transmission) three-phase grid 2a and a single-phase railway grid 2b. The public grid 2a is connected with the converter 1 at a first PCC 6a and to the valve arrangement 4 via a first transformer 5a, while the railway grid 2b is connected with the converter 1 at a second PCC 6b and to the valve arrangement 4 via a second transformer 5b. The control system 3 comprises at least one grid-side current controller 20 for, e.g. for each or one of, the grids 2a and 2b.

Active behaviour has been observed in power electronics converters 1 with various topologies in various applications. This happens typically in the frequency range between 300 to 1000 Hz, especially due to the power electronics converter control system 3, which has a time discrete current controller (i.e. operating with defined cycle times). The active behaviour is related to the delay introduced by the time discrete control. The present disclosure relates to implementation of a technical solution to improve the passivity of the power electronics converters, by applying a faster current feedback path (beside the normal current feedback with delay in the closed-loop control) without influencing the Safe Operating Area (SOA) in the control algorithm. The objective to improve the passivity of the power electronics converters without introducing other unnecessary structural changes especially the various SOA limits in the control software may be achieved. In addition, embodiments may be applied in any power electronics converter, which has a current controller, independent of the converter topology.

Grid connected power electronics converters 1 with active behaviours are not welcomed by the network operators, since in this case, especially if oscillations/resonances occur in the grid 2 in the frequency range where the converter is active, the converter will behave as a source to deliver energy to support the oscillations/resonances, instead of damping the oscillations by consuming energy. Therefore, it is preferred that the power electronics converters are passive in the frequency range which is relevant depending on application.

It should also be noted that the current controller of the control system 3 for each grid 2 typically comprises a plurality of sub-controllers, e.g. one for each phase if ABC frame is used. In accordance with the present invention, the current controller 20 is divided into first, second and third parts A, B and C, each of which may consequently comprise sub-controllers depending on the frame used. The different parts A, B and C may use any frame. Conventional frames include ABC frame (with one sinusoidal signal per phase), αβ frame (with sinusoidal signals in complex plane), and direct quadrature (dq) frame (also called xy frame). For a three-phase grid 2, ABC frame implies the use of three sub-controllers, αβ frame implies the use of two sub-controllers, and dq frame implies the use of two sub-controllers.

Either frame, the same or different, can be used in the different parts A, B and C of the current controller 20, e.g. ABC, αβ and/or dq frame. In some embodiments, it may be convenient to use dq frame for the slower task parts A and C, e.g. to reduce the number of sub-controllers, while dq frame may be inconvenient for the faster task part B since with direct quadrature information is needed about the phase angles, which implies more effort is needed which may be undesirable in the faster tasks.

In the following, with reference to FIGS. 2-7, the current controller 20 uses dq frame in the slower tasks, indicated by the subscript "x", and ABC frame in the faster tasks, indicated by the subscript "ABC".

Figure 2:
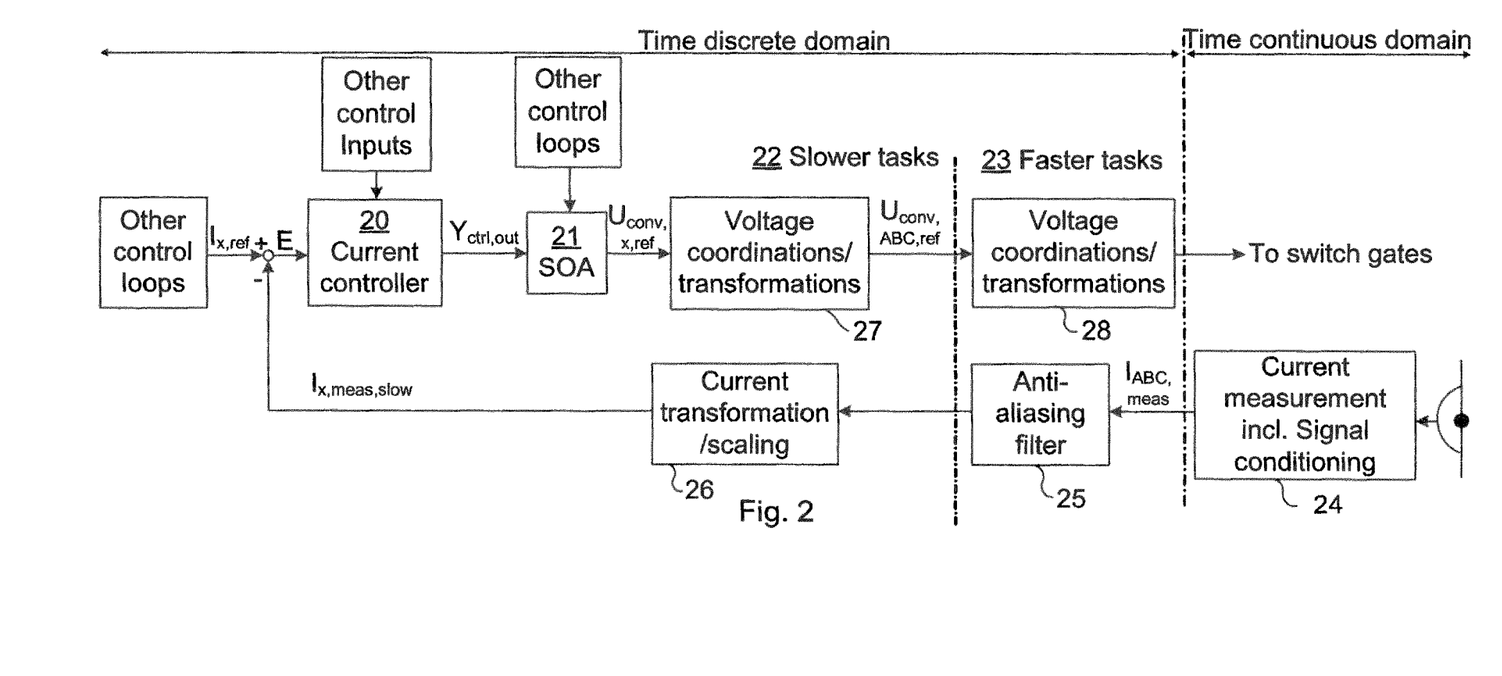
FIG. 2 is a schematic functional block diagram of feedback current control in slower tasks, in accordance with embodiments of the present invention.

FIG. 2 illustrates embodiments of a feedback loop for the slower tasks 22, operating at the first (longer) control cycle time, of the control system 3, which is also in accordance with conventional techniques. In time continuous domain, current measurements 24 are performed to give a measured current $I_{meas}$, which is here in ABC frame ($I_{ABC,meas}$), which is entered into time discrete domain. The measured current may then be processed in conventional manner, e.g. by applying an anti-aliasing filter 25 (which may still be in faster tasks 23) and/or current transformation or scaling 26 as needed (which may be after entering the slower tasks 22), to give a slower tasks measured current $I_{meas,slow}$, here in dq frame ($I_{x,meas,slow}$). This slower tasks measured current is deducted from the reference current $I_{ref}$, here in dq frame ($I_{x,ref}$) to give an error E operated on by the current controller 20. The current controller may e.g. comprise integral or resonance control in addition to proportional control. The current controller 20 outputs a control voltage $Y_{ctrl,out}$. However, the controller output $Y_{ctrl,out}$ may be outside of the Safe Operating Area (SOA) 21 limits of the converter, why SOA limits are applied to the controller output to ensure that the reference voltage $U_{conv,ref}$ for the converter, here in dq frame ($U_{conv,x,ref}$) resulting from the application of the SOA 21 limits can be safely handled by the valves of the valve arrangement 4. The reference voltage $U_{conv,ref}$ may be conventionally handled, e.g. by voltage coordinations or transformations 27 and 28 in slower and faster tasks 22 and 23, respectively, as needed. In the example of FIG. 2, the reference voltage $U_{conv,ref}$ is transformed from dq frame ($U_{conv,x,ref}$) to ABC frame ($U_{conv,ABC,ref}$) before it is sent to the modulator 28. The generated switching signals are then sent to the gates of the semiconductor switches of the converter valves in the valve arrangement in time continuous domain. As indicated in the figure, other (e.g. conventional) control loops and inputs may be acting on the feedback loop, but this is typically outside the scope of the present disclosure.

A grid connected power electronics converter 1 often has a current controller 20 on grid side, so that it is able to respond fast during load steps and/or grid transients (grid faults) and meanwhile exchange active/reactive power between the converter and the grid 2. FIG. 2 illustrates such a closed-loop control structure for a current controller 20. The controller can be a Proportional-Integral (PI) controller with or without a Differential (D) part, or a Proportional-Resonance (PR) controller. For a three phase system, the controller may be implemented in the known rotary xy (also called dq) coordinate system (frame), which rotates with the fundamental frequency of the power system, or in some embodiments in αβ- or ABC-frame depending on the chosen controller type. The controller may also have other control loops/inputs beside the current measurements, which interacts with the current controller. Beside the linear part of the current controller, various limiters might be implemented at the output of the current controller in the control algorithm, for better control performance and/or for protection purposes. These limiters may include real voltage (or its equivalent) Safe Operating Area (SOA) limiters and/or the anti-windup logic preventing integration wind-up of the integral part of the current controller when the actuator is saturated. In this context, all such limiters relevant for this discussion may be shorted as SOA.

Digital controllers running with a fixed step size are commonly used for current controller 20. However, delays appear in the closed-loop. The delays in the feedback path may correspond to the delay caused by the sampling and communication delay from the current measurement 24 to the controller 20. The delays that appear in the forward path may consist of the communication delay from the controller 20 to the gate of the power electronics switches of the valve arrangement 4 and the control algorithm task time which includes control algorithm execution and IO (Inputs/Outputs) read/write. Depending on the control hardware setup and complexity of the control algorithm, the induced delay can be from hundred micro-seconds to several hundred micro-seconds.

For the fundamental frequency, the delay may be conventionally compensated, since in most of the cases the current controllers are realized in a rotary dq coordinate system. However, this cannot be done for all frequency components, which leads to the active behaviours of power electronics converters, typically in the range of from ca. 300 Hz to ca. 1000 Hz.

Due to causality, delays (noted as $t_d$) cannot be compensated by simply multiplying an inverse function of $e^{tds}$) in the feedback path, even though they can be mathematically described exactly with $e^{-tds}$ in frequency domain. So other methods have been used to improve the passivity of the converter, e.g. reduce the active part and shift it to higher frequency range.

Figure 3:
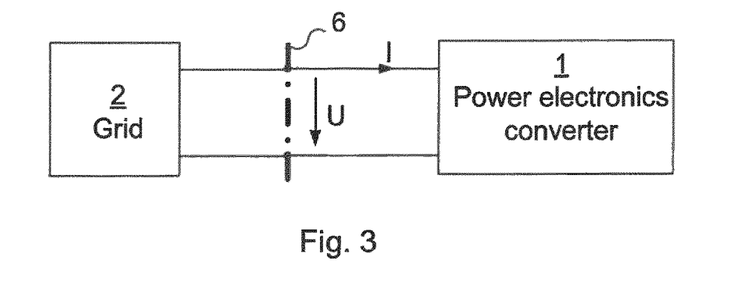
FIG. 3 is a more simplified schematic block diagram of an embodiment of a power electronics converter connected to a power grid.

FIG. 3 illustrates a grid connected converter 1, with a current I entering the converter from the grid 2 and a voltage U between the terminals of the power electronics converter 1 or grid 2. The converter is seen as an admittance curve Y(jω), in frequency domain. A measure for the passivity is the phase curve of the converter admittance measured at the PCC 6. The converter is passive only if the phase curve of the converter admittance stays within ±90°, i.e. the admittance has a positive real part, in the whole frequency range, referencing to a consumer system, i.e. the positive current I direction is going into the converter. If this condition is fulfilled, for all frequency components, the converter will always remain as a consumer (active power P≥0). With this, in case that a resonance occurs in the grid 2, the converter will not provide energy, but consume energy.

Beside slowing down the closed-loop control speed and increasing the anti-aliasing filter corner frequency, reducing the delays in the current feedback path is an effective and low-cost way to improve the converter passivity.

However, because of the complex control and protection functions in the control algorithm, it costs large effort to move the whole controller 20 to one of the faster tasks 23 such as by implementing it in a Field Programmable Gate Array (FPGA). Even when this could be done, due to the amount of calculations to be done within each discrete time step, the step size of the control software may not be made arbitrarily small to fulfil the passivity requirement.

Figure 4:
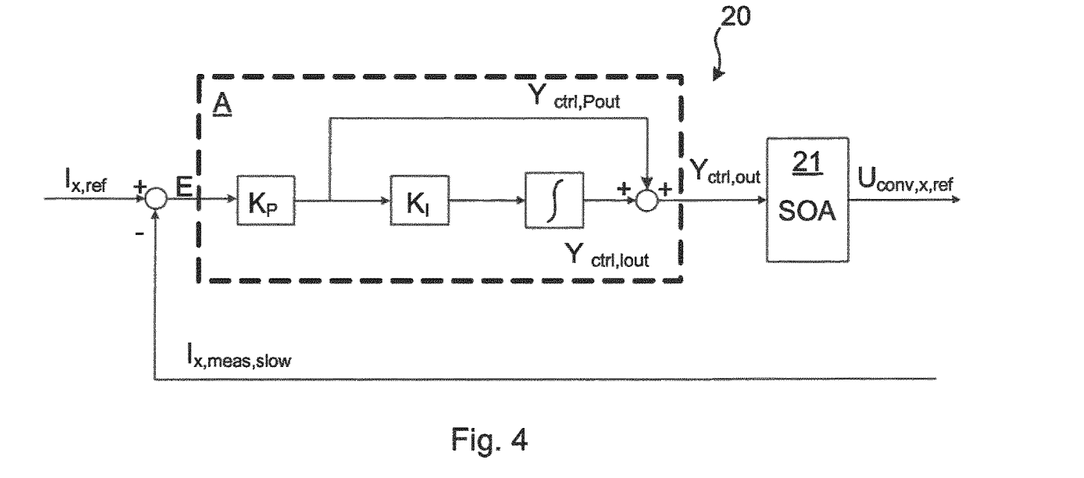
FIG. 4 is a schematic functional block diagram of a first current control part A in slower tasks, in accordance with embodiments of the present invention.
Figure 5:
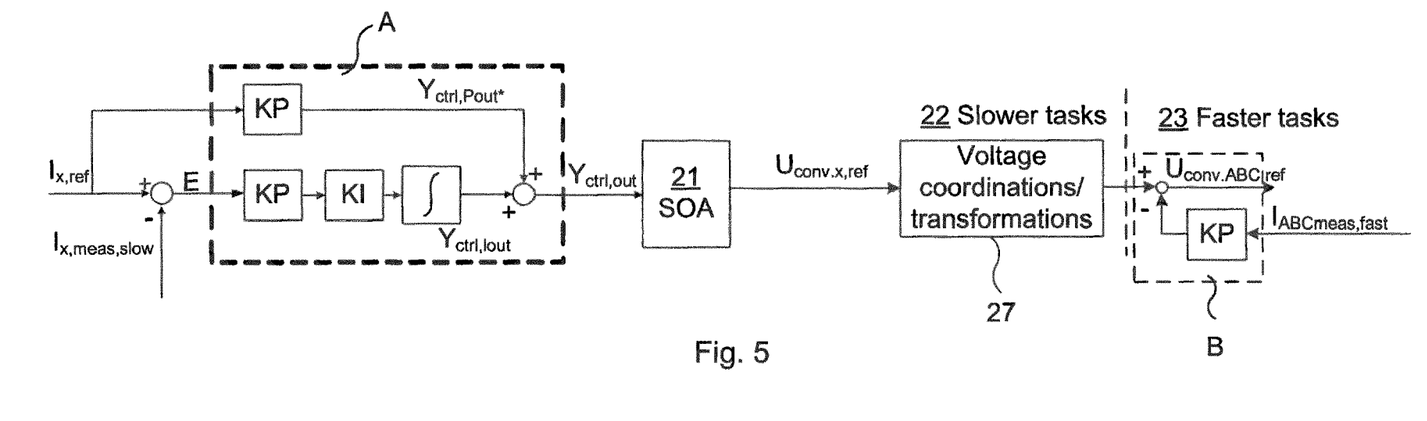
FIG. 5 is a schematic functional block diagram of first and second current control parts A and B in slower tasks and faster tasks, respectively, in accordance with embodiments of the present invention.

With reference to FIGS. 4 and 5, taking a PI controller as an example, from a linear perspective, instead of moving the whole current-controller 20 of FIG. 4, only the current feedback path with the correct gain (dashed box B) is moved to a faster task 23 and the controller without current feedback path is left in slower task (dashed box A), as shown in FIG. 5 with a PI controller as an example. With this solution, the closed-loop system is stable and has no steady state error, if the same proportional gain $K_P$ is used in the faster current feedback path. The converter 1 is passive till the Nyquist frequency.

However, this solution may not work in practice, because of the various SOA limits 21 applied at the output $Y_{ctrl,out}$ of the first part A of the current controller 20.

As it can be seen in FIG. 4, the controller output $Y_{ctrl,out}$ consists of two parts, the proportional part $Y_{ctrl,Pout}$ and the integral part $Y_{ctrl,Iout}$. In steady state, the error E between the current set-point and the measured current tends to zero, the proportional part $Y_{ctrl,Pout}$ tends to zero and the controller output $Y_{ctrl,out}$ is defined by the integral part of the controller $Y_{ctrl,Iout}$, neglecting the contribution from other control inputs/loops. Typically this is around the nominal voltage (or close to 1.0 pu in a per unit (pu) system without considering e.g. the feedforward voltage). However, with the control structure shown in FIG. 5, the error E still tends to zero in steady state and the integral part of the controller $Y_{ctrl,Iout}$ is still around the nominal voltage. But, since the current feedback in this case is made after the SOA 21, the proportional part $Y_{ctrl,Pout^*}$ seen by the SOA is $Kp*I_{x,ref}$. In other words, the absolute value of the controller output $Y_{ctrl,Iout}$ can be too high depending on the current set-point $I_{x,ref}$.

Figure 6:
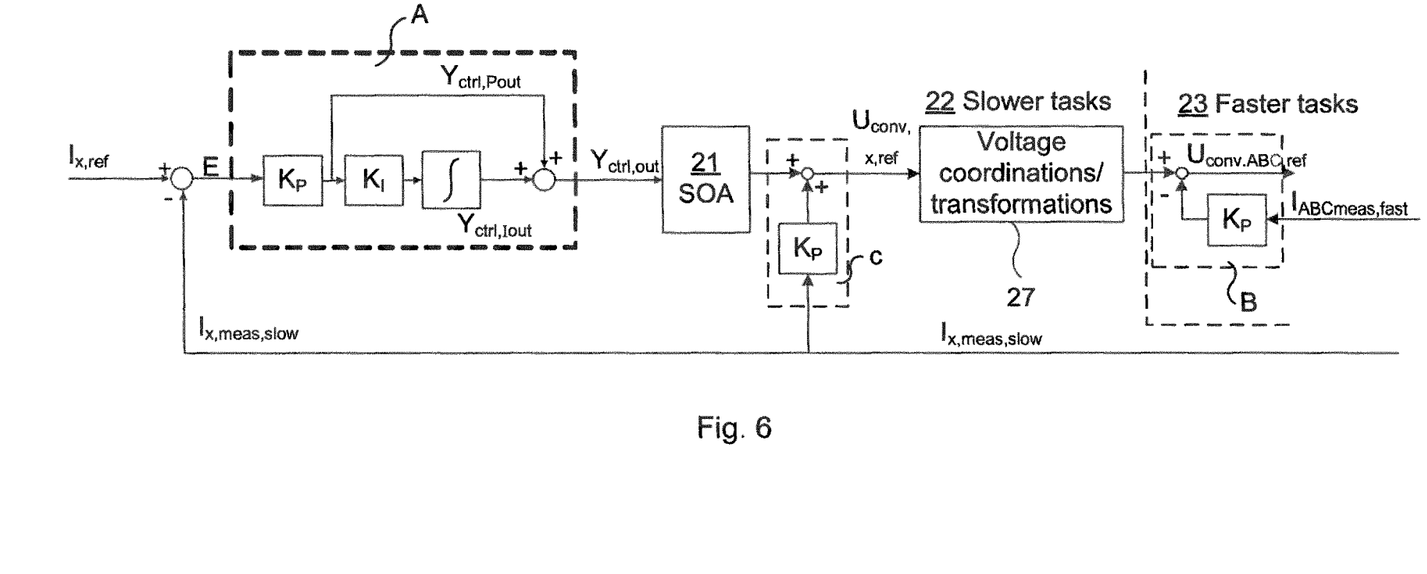
FIG. 6 is a schematic functional block diagram of first and third current control parts A and C in slower tasks and a second current control part B in faster tasks, in accordance with embodiments of the present invention.

The SOA may be a complex function, based on several other quantities in the system. Very often, these limits also interact with other control loops. With reference to FIG. 6, to be able to implement a faster feedback without changing the SOA implementation, the original current controller (dashed box A in FIG. 6) and SOA 21 are left as they are. The slow current feedback used in the current controller is got rid of by adding $Kp \times I_{x,meas,slow}$ (dashed box C in FIG. 6) after the SOA 21, so that the proportional part of the feedback doesn't appear twice in the control structure. A faster negative feedback path $Kp \times I_{ABC,meas,fast}$ (dashed box B in FIG. 6) is constructed after the SOA 21 but before the voltage references are written to the modulator.

Figure 7:
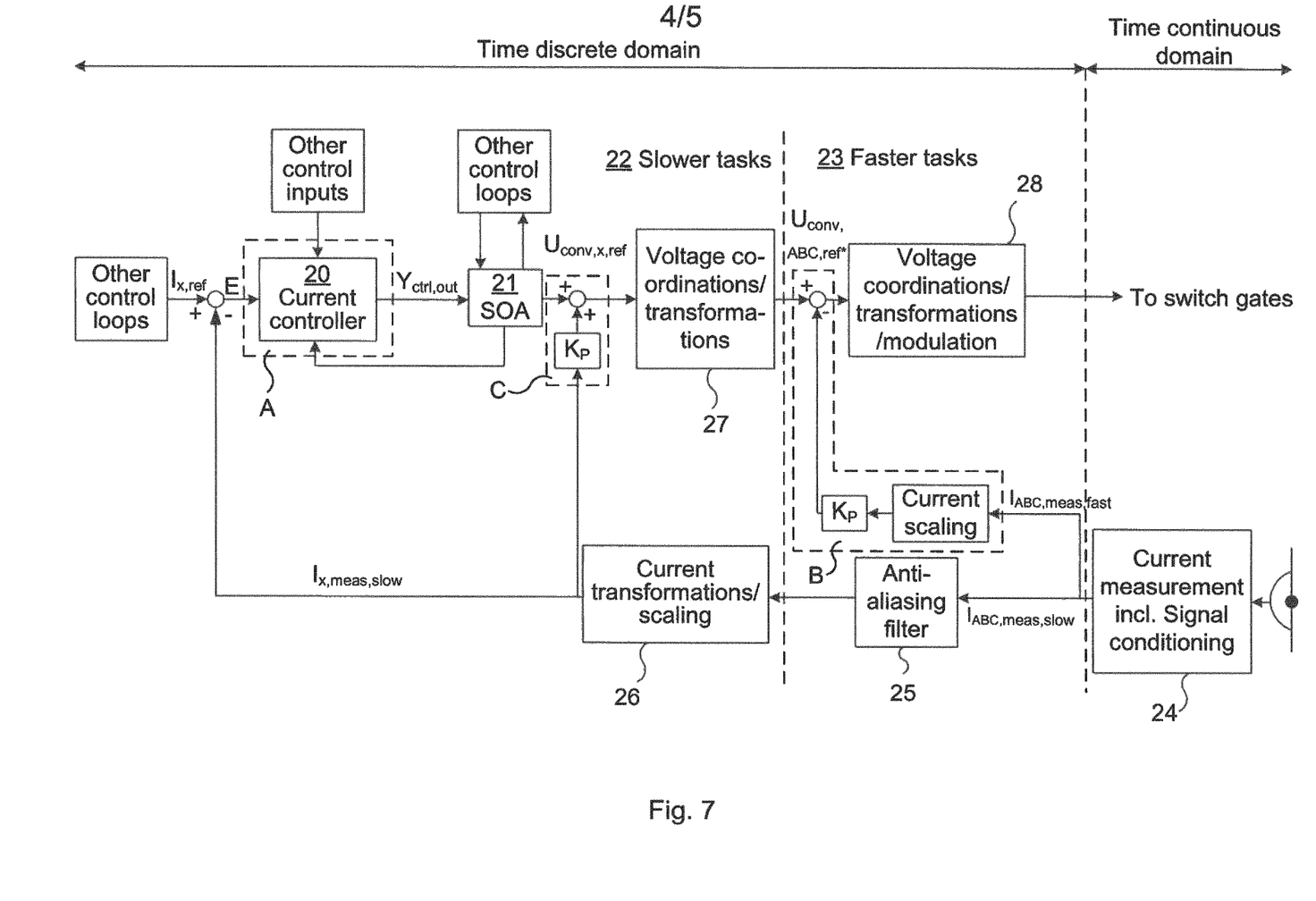
FIG. 7 is a schematic functional block diagram in more detail of first and third current control parts A and C in slower tasks and a second current control part B in faster tasks, in accordance with embodiments of the present invention.

A solution in accordance with the present invention in a typical closed-loop control is shown in FIG. 7 in more detail than in FIG. 6, comprising three parts:

1) The complete traditional current controller implementation in the slower tasks 22 (dashed box A).
2) A new slow feedback path compensation after SOA 21 in in the slower tasks 22 (dashed box C).
3) A new faster feedback path construction in one of the faster tasks 23 (dashed box B)

With embodiments of the present invention, the converter 1 is passive, or at least more passive than with conventional means, at least to the Nyquist frequency.

It should be noted that the faster current feedback path in the faster tasks 23 is in this example implemented in ABC frame without involving a precise cot generation for the ABC-to-dq transformation.

Figure 8:
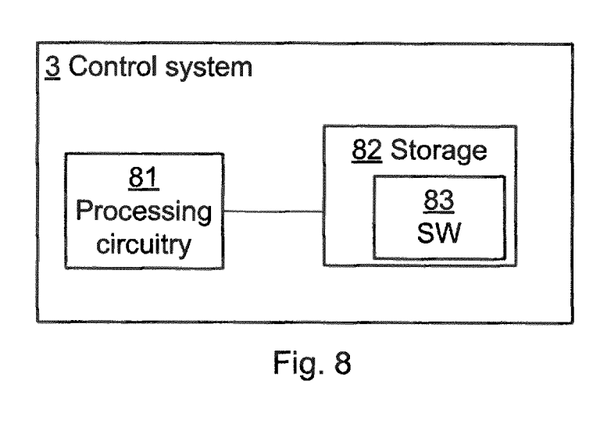
FIG. 8 is a schematic block diagram of an embodiment of a control system of a power electronics converter, in accordance with embodiments of the present invention.

FIG. 8 schematically illustrates an embodiment of a control system 3 of the converter 1 of the present disclosure. The control system is configured for providing the grid-side current controller 20 with its different parts A, B and C, discussed herein. The control system is arranged for controlling the converter by using references and controlling the conducting and non-conducting states of the valve switches of the valve arrangement 4 based on said references. The control system 3 comprises processing circuitry 81 e.g. a central processing unit (CPU). The processing circuitry 81 may comprise one or a plurality of processing units in the form of microprocessor(s). However, other suitable devices with computing capabilities could be comprised in the processing circuitry 81, e.g. an application specific integrated circuit (ASIC), a field programmable gate array (FPGA) or a complex programmable logic device (CPLD). The processing circuitry 81 is configured to run one or several to computer program(s) or software (SW) 83 stored in a data storage 82 of one or several storage unit(s) e.g. a memory. The storage unit is regarded as a computer readable means as discussed herein and may e.g. be in the form of a Random Access Memory (RAM), a Flash memory or other solid state memory, or a hard disk, or be a combination thereof. The processing circuitry 81 may also be configured to store data in the storage 82, as needed.

Figure 9:
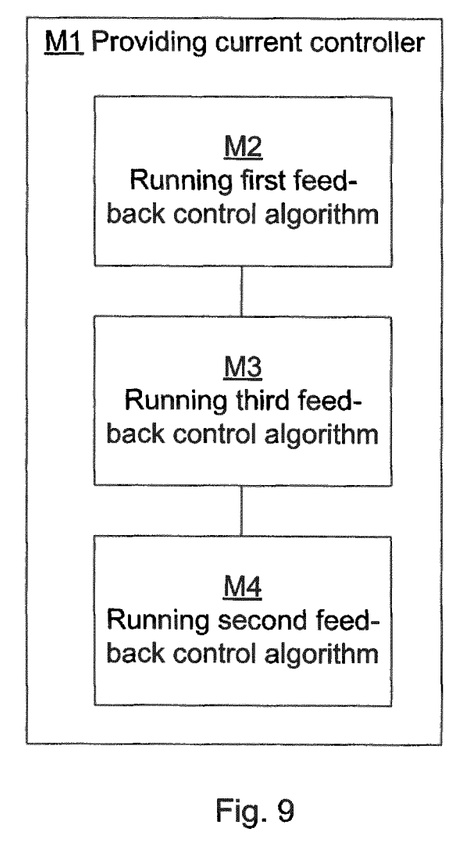
FIG. 9 is a schematic flow chart of a method in accordance with embodiments of the present invention.

FIG. 9 illustrates some embodiments of the method herein discussed. The method is performed by a control system 3 of a power electronics converter 1 comprising a valve arrangement 4 and connected to a power grid 2. A grid-side current controller 20 for controlling power output from the converter 1 to the grid 2 is provided M1. As a first part A of said provided M1 controller 20, a first feedback control algorithm is run M2 with an input based on a difference E between a predetermined current reference $I_{ref}$ and a first feedback current measurement $I_{meas,slow}$ of a current I in the converter, wherein the first feedback control algorithm has a first control cycle time and includes at least proportional control using a proportional gain $K_P$. As a third part C of said provided M1 controller 20, a third feedback control algorithm is run M3 with an input based on the first feedback current measurement $I_{meas,slow}$, wherein the third feedback control algorithm has the first control cycle time and acts on an output $Y_{ctrl,out}$ from the first control algorithm after SOA limits 21 have been applied to said first control algorithm output and includes counteracting the proportional control of the first feedback control algorithm using the proportional gain $K_P$. As a second part B of said provided M1 controller 20, a second feedback control algorithm is run M4 with an input based on a second feedback current measurement $I_{meas,fast}$ of the current I, wherein the second feedback control algorithm has a second control cycle time and acts on an output $U_{conv,ref}$ from the third control algorithm with the same polarity as the first control algorithm and includes proportional control using the proportional gain $K_P$. The second control cycle time is less than the first control cycle time.

In some embodiments, the second feedback control algorithm acts on the output ($U_{conv,ref}$) from the third control algorithm after voltage coordinations/transformations 27 thereof, as in FIGS. 6 and 7.

In some embodiments of the present invention, the first feedback control algorithm further includes integral or resonance control, in addition to the proportional control, using an integral gain ($K_I$) or a resonance gain, respectively.

In some embodiments of the present invention, the first control cycle time is at least two, five or ten times longer than the second control cycle time. A shorter second control cycle time puts more strain on the controller but may better obtain sufficient passivity. Thus, it is preferred that the first control cycle time is at five, more preferred ten, times longer than the second control cycle time.

In some embodiments of the present invention, the first control cycle time is at least 50 µs or 100 µs, e.g. within the range of from 100 to 250 µs or 200 µs. Preferably, the first control cycle time is at least 100 µs, e.g. within the range of 100-200 µs.

Additionally or alternatively, in some embodiments of the present invention, the second control cycle time is at most 50 µs such as at most 10 µs, e.g. within the range of from 5 to 50 or 10 µs. As mentioned herein, a shorter second control cycle time may be needed to obtain adequate passivity, why it may be preferred that the second control cycle time is at most 10 µs, e.g. within the range of 5-10 µs.

As mentioned herein, each of the first, second and third feedback control algorithms can operate in any suitable frame, such as in any of ABC, αβ or dq (also called xy). In some embodiments, dq is less preferred for the second feedback control algorithm since it requires information about the phase angles implying more effort which is undesired in the faster tasks 23. However, for the first and third feedback control algorithms to operate in dq frame may be preferred in some embodiments. The second feedback control algorithm may instead conveniently operate in ABC frame, or αβ frame with sinusoidal complex plane signals, preferably ABC frame in some embodiments.

In some embodiments of the present invention, the first and second feedback current measurements $I_{meas,slow}$ and $I_{meas,fast}$ are of the current I between the valve arrangement 4 and the grid 2, e.g. on either a valve or a grid side of a transformer 5 or reactor of the converter 1, or within the valve arrangement 4, e.g. by measurements in the two branches (also called legs or arms) of a phase in an MMC with a double-star (also called double-wye or −Y) topology, e.g. for a railway intertie, or in phase legs of an MMC with a delta (Δ) topology, e.g. for a STATCOM.

In some embodiments of the present invention, the power electronics converter (1) is a Neutral Point Clamped, NPC, three level converter or a Modular Multilevel Converter, MMC. NPC and MMC are examples of converter types which are often used. However, embodiments of the present invention may be useful with any type of power electronics converter, of any topology, configured for being connected to a grid.

In some embodiments of the present invention, the power electronics converter is configured for the grid 2 being a three-phase grid. However, embodiments of the present invention may be useful with any type of AC grid, with any number of phases, e.g. a single phase grid.

In some embodiments of the present invention, the power electronics converter is configured to operate as a three-to-one phase rail intertie, as a STATCOM or as a three-to-three phase converter such as a Pumped Hydro or wind power converter. However, embodiments of the present invention may be useful with any type of power electronics converter and any type of AC grid.

Embodiments of the method of the present invention may be performed by the control system 3, e.g. including a current controller 20, which control system 3 comprises processing circuitry 81 associated with data storage 82. The processing circuitry may be equipped with one or more processing units CPU in the form of microprocessor(s) executing appropriate software stored in associated memory for procuring required functionality. However, other suitable devices with computing capabilities could be comprised in the processor, e.g. an application specific integrated circuit (ASIC), a field programmable gate array (FPGA), a complex programmable logic device (CPLD), etc., in order to control the semiconductor valve switches of the valve arrangement 4 in the converter 1 and perform embodiments of the method of the present disclosure, while executing appropriate software 83, e.g. stored in a suitable data storage 82, such as a RAM, a Flash memory or a hard disk, or in the processing circuitry itself (as e.g. in case of an FPGA).

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product 82 which is a non-transitory storage medium or computer readable medium (media) having instructions 83 stored thereon/in, in the form of computer-executable components or software (SW), which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

In a more general embodiment, the present invention relates to a method performed by a control system 3 of a power electronics converter 1. The method comprises providing a grid-side current controller 20 for controlling power output from the converter to a power grid 2. A first part A of the controller runs a first feedback control algorithm having a first control cycle time and includes at least proportional control using a proportional gain $K_P$. A third part C of the controller runs a third feedback control algorithm having the first control cycle time and acting on an output $Y_{ctrl,out}$ from the first control algorithm after SOA limits 21 have been applied and includes counteracting the proportional control of the first feedback control algorithm. A second part B of the controller runs a second feedback control algorithm having a second control cycle time, less than the first control cycle time, and acting on an output $U_{conv,ref}$ from the third control algorithm with the same polarity as the first control algorithm and includes proportional control using the proportional gain $K_P$.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a control system of a power electronics converter that comprises a valve arrangement and is connected to a power grid, the method comprising:
   executing a first feedback control algorithm with an input based on a difference between a predetermined current reference and a first feedback current measurement of a current in the converter, wherein the first feedback control algorithm has a first control cycle time and includes at least proportional control using a proportional gain;
   executing a third feedback control algorithm with an input based on the first feedback current measurement, wherein the third feedback control algorithm has the first control cycle time and acts on an output from the first feedback control algorithm after Safe Operating Area limits have been applied to the first feedback control algorithm output, the third feedback control algorithm including proportional control using the proportional gain but with a different polarity compared to the first feedback control algorithm; and
   executing a second feedback control algorithm with an input based on a second feedback current measurement of the current, wherein the second feedback control algorithm has a second control cycle time and acts on an output from the third feedback control algorithm with the same polarity as the first feedback control algorithm and includes proportional control using the proportional gain, the second control cycle time being less than the first control cycle time;
   wherein the first, second and third feedback control algorithms are executed by a grid-side current controller to control power output from the converter to the power grid.

2. The method of claim 1, wherein the second feedback control algorithm acts on the output after voltage co-ordinations/transformations thereof.

3. The method of claim 1, wherein the first feedback control algorithm further includes integral or resonance control, using an integral gain or a resonance gain.

4. The method of claim 1, wherein the first control cycle time is at least two times longer than the second control cycle time.

5. The method of claim 4, wherein the first control cycle time is at least ten times longer than the second control cycle time.

6. The method of claim 1, wherein the first control cycle time is within a range from 50 µs to 250 µs.

7. The method of claim 1, wherein the second control cycle time is within a range from 5 µs to 50 µs.

8. The method of claim 1, wherein the first control cycle time is within a range from 50 µs to 250 µs and the second control cycle time is within a range from 5 µs to 50 µs.

9. The method of claim 8, wherein the first control cycle time is at least five times longer than the second control cycle time.

10. The method of claim 8, wherein the first control cycle time is within a range from 100 µs to 200 µs and the second control cycle time is within a range from 5 µs to 10 µs.

11. The method of claim 1, wherein the first and third feedback control algorithms operate in direct quadrature frame.

12. The method of claim 1, wherein the second feedback control algorithm operates in ABC frame.

13. The method of claim 1, wherein the first and second feedback current measurements are measurements of current between the valve arrangement and the power grid.

14. The method of claim 13, wherein the first and second feedback current measurements are measurements of current on either a valve or a grid side of a transformer or reactor of the converter.

15. The method of claim 13, wherein the first and second feedback current measurements are measurements of current within the valve arrangement.

16. A computer program product comprising computer-executable components for causing the control system to perform the method of claim 1 when the computer-executable components are run on processing circuitry comprised in the grid-side current controller.

17. A control system for a power electronics converter comprising a valve arrangement and connected to a power grid, the control system comprising:
   processing circuitry; and
   data storage storing instructions executable by the processing circuitry to cause the processing circuitry to:
      run a first feedback control algorithm with an input based on a difference between a predetermined current reference and a first feedback current measurement of a current in the converter, wherein the first feedback control algorithm has a first control cycle time and includes at least proportional control using a proportional gain;
      run a third feedback control algorithm with an input based on the first feedback current measurement, wherein the third feedback control algorithm has the first control cycle time and acts on an output from the first feedback control algorithm after Safe Operating Area limits have been applied to the first feedback control algorithm output, the third feedback control algorithm including proportional control using the proportional gain but with a different polarity compared to the first feedback control algorithm; and
      run a second feedback control algorithm with an input based on a second feedback current measurement of the current, wherein the second feedback control algorithm has a second control cycle time and acts on an output from the third feedback control algorithm with the same polarity as the first feedback control algorithm and includes proportional control using the proportional gain, wherein the second control cycle time is less than the first control cycle time.

18. A power electronics converter comprising the control system of claim 17 and the valve arrangement.

19. The power electronics converter of claim 18, wherein the power electronics converter is a neutral point clamped three level converter or a modular multilevel converter.

20. The power electronics converter of claim 18, wherein the power electronics converter is configured for the power grid being a single phase or three-phase grid.

21. The power electronics converter of claim 18, wherein the power electronics converter is configured to operate as a three-to-one phase rail intertie, as a Static Compensator or as a three-to-three phase converter.

22. A method performed by a control system of a power electronics converter that comprises a valve arrangement and is connected to a power grid, the method comprising:

provi­ding a grid-side current controller for controlling power output from the converter to the power grid;

as a first part of the controller, running a first feedback control algorithm with an input based on a difference between a predetermined current reference and a first feedback current measurement of a current in the converter, wherein the first feedback control algorithm has a first control cycle time and includes at least proportional control using a proportional gain;

as a third part of the controller, running a third feedback control algorithm with an input based on the first feedback current measurement, wherein the third feedback control algorithm has the first control cycle time and acts on an output from the first feedback control algorithm after Safe Operating Area limits have been applied to the first feedback control algorithm output, the third feedback control algorithm including proportional control using the proportional gain but with a different polarity compared to the first feedback control algorithm; and as a second part of the controller, running a second feedback control algorithm with an input based on a second feedback current measurement of the current, wherein the second feedback control algorithm has a second control cycle time and acts on an output from the third feedback control algorithm with the same polarity as the first feedback control algorithm and includes proportional control using the proportional gain, wherein the second control cycle time is less than the first control cycle time.

\* \* \* \* \*